(12) United States Patent
Luo et al.

(10) Patent No.: US 9,089,726 B1
(45) Date of Patent: Jul. 28, 2015

(54) PASSTHROUGH FIRESTOPS

(71) Applicant: Pyrophobic Systems Ltd., Barrie (CA)

(72) Inventors: Xiaoxiong Luo, Barrie (CA); John B. Page, Barrie (CA)

(73) Assignee: PYROPHOBIC SYSTEMS, LTD., Barrie (CA)

( * ) Notice: Subject to any disclaimer, the term of this patent is extended or adjusted under 35 U.S.C. 154(b) by 0 days.

(21) Appl. No.: 14/280,034

(22) Filed: May 16, 2014

(51) Int. Cl.
*E04C 2/00* (2006.01)
*A62C 2/06* (2006.01)
*E04B 1/94* (2006.01)
*F16L 5/04* (2006.01)

(52) U.S. Cl.
CPC ............. *A62C 2/065* (2013.01); *E04B 1/948* (2013.01); *F16L 5/04* (2013.01)

(58) Field of Classification Search
CPC ............ F16L 5/04; A62C 2/065; E04B 1/948
USPC ..................... 52/232, 235, 220.8
See application file for complete search history.

(56) References Cited

U.S. PATENT DOCUMENTS

| | | | |
|---|---|---|---|
| 3,955,330 A | 5/1976 | Wendt | |
| 4,137,376 A | 1/1979 | Clegg et al. | |
| 4,364,210 A | 12/1982 | Fleming et al. | |
| 4,513,173 A | 4/1985 | Merry | |
| 4,630,415 A | 12/1986 | Attwell | |
| 4,754,377 A | 6/1988 | Wenman | |
| 4,888,925 A | 12/1989 | Harbeke | |
| 4,916,800 A | 4/1990 | Harbeke | |
| 5,058,341 A * | 10/1991 | Harbeke, Jr. | 52/232 |
| 5,103,609 A * | 4/1992 | Thoreson et al. | 52/232 |
| 5,129,201 A | 7/1992 | Robertson et al. | |
| 5,174,077 A | 12/1992 | Murota | |
| 5,301,475 A | 4/1994 | Stefely | |
| 5,417,019 A | 5/1995 | Marshall et al. | |
| 5,452,551 A | 9/1995 | Charland et al. | |
| 5,887,395 A | 3/1999 | Navarro et al. | |
| 5,950,376 A | 9/1999 | Kemeny et al. | |
| 6,105,334 A | 8/2000 | Monson et al. | |

(Continued)

FOREIGN PATENT DOCUMENTS

| | | |
|---|---|---|
| CA | 2786202 A1 | 3/2013 |
| CN | 101656304 | 9/2011 |

(Continued)

OTHER PUBLICATIONS

Tremco Illbruck Coating Ltd., "B600 Intumescent Pipe Sleeve", Jun. 2010, retrieved Dec. 10, 2013 at: http://www.nullifirefirestopping.co.uk/celumdb/documents/Nullifire_B600_DS_GB_19530.pdf, (4 pages).

(Continued)

*Primary Examiner* — Mark Wendell
*Assistant Examiner* — Keith Minter
(74) *Attorney, Agent, or Firm* — Marshall, Gerstein & Borun LLP

(57) ABSTRACT

A firestop element can be installed as a passthrough for a floor of a building. The element has a rigid annular body having a first section and a second section. At least a portion of the first section is fabricated of a polymer intumescent composition. This portion has an inner annular surface with a plurality of spaced lands and a void extending between each pair of lands. The second section is a sleeve having a smaller diameter than the first section.

22 Claims, 11 Drawing Sheets

(56) References Cited

U.S. PATENT DOCUMENTS

| | | | |
|---|---|---|---|
| 6,305,133 B1 | 10/2001 | Cornwall | |
| 6,336,297 B1 | 1/2002 | Cornwall | |
| 6,412,243 B1 | 7/2002 | Sutelan | |
| 6,645,278 B2 | 11/2003 | Langille et al. | |
| 6,694,684 B2 | 2/2004 | Radke et al. | |
| 6,725,615 B1* | 4/2004 | Porter | 52/232 |
| 6,747,074 B1 | 6/2004 | Buckingham et al. | |
| 6,790,893 B2 | 9/2004 | Nguyen et al. | |
| 7,080,486 B2 | 7/2006 | Badke et al. | |
| 7,397,219 B2 | 7/2008 | Phillips et al. | |
| 7,470,048 B2 | 12/2008 | Wu | |
| 7,476,010 B2 | 1/2009 | Johnson | |
| 7,486,047 B2 | 2/2009 | Phillips et al. | |
| 7,651,238 B2 | 1/2010 | O'Brien | |
| 7,651,248 B2 | 1/2010 | Hua | |
| 7,670,033 B2 | 3/2010 | Steer et al. | |
| 7,913,468 B2* | 3/2011 | Spais | 52/232 |
| 7,954,974 B2 | 6/2011 | Johnson | |
| 8,146,305 B2 | 4/2012 | Cordts | |
| 8,263,254 B2 | 9/2012 | Mehta et al. | |
| 8,277,965 B2 | 10/2012 | Hermann et al. | |
| 8,367,233 B2 | 2/2013 | Hermann et al. | |
| 8,393,121 B2 | 3/2013 | Beele | |
| 8,397,452 B2* | 3/2013 | Stahl et al. | 52/232 |
| 2002/0155348 A1 | 10/2002 | Gitto | |
| 2004/0100040 A1 | 5/2004 | Sakno | |
| 2004/0168398 A1* | 9/2004 | Sakno et al. | 52/741.4 |
| 2005/0170238 A1 | 8/2005 | Abu-Isa et al. | |
| 2006/0096207 A1* | 5/2006 | Spais | 52/317 |
| 2006/0234119 A1 | 10/2006 | Kruger et al. | |
| 2008/0011383 A1 | 1/2008 | Paetow et al. | |
| 2010/0136391 A1 | 6/2010 | Prilutsky et al. | |
| 2010/0136404 A1 | 6/2010 | Hermann et al. | |
| 2011/0064997 A1 | 3/2011 | Peskar et al. | |
| 2011/0088342 A1* | 4/2011 | Stahl et al. | 52/220.8 |
| 2011/0262783 A1 | 10/2011 | Mehta | |
| 2011/0281154 A1 | 11/2011 | Vissers et al. | |
| 2012/0034501 A1 | 2/2012 | Hermann et al. | |
| 2012/0231318 A1 | 9/2012 | Buck et al. | |
| 2012/0233943 A1* | 9/2012 | Monden et al. | 52/220.1 |
| 2012/0304979 A1 | 12/2012 | Munzenberger et al. | |
| 2013/0061545 A1* | 3/2013 | Van Walraven et al. | 52/232 |
| 2013/0086857 A1 | 4/2013 | Paetow et al. | |
| 2013/0104474 A1* | 5/2013 | Klein | 52/232 |
| 2013/0118102 A1* | 5/2013 | Pilz et al. | 52/232 |
| 2013/0143076 A1 | 6/2013 | Sachdev et al. | |
| 2013/0247487 A1* | 9/2013 | Turner | 52/220.8 |
| 2014/0077043 A1 | 3/2014 | Foerg | |

FOREIGN PATENT DOCUMENTS

| | | | |
|---|---|---|---|
| DE | 19934902 | A1 | 1/2000 |
| DE | 202012003405 | U1 | 8/2013 |
| DE | 102013203173 | A1 | 10/2013 |
| EP | 0635665 | B1 | 3/1997 |
| EP | 1273841 | A1 | 1/2003 |
| EP | 2572760 | A2 | 3/2013 |
| GB | 2077382 | A | 12/1981 |
| GB | 2108614 | A | 5/1983 |
| KR | 20070023293 | | 2/2007 |
| WO | 2011/124886 | A2 | 10/2011 |
| WO | 2012/080758 | A2 | 6/2012 |
| WO | 2013045937 | A2 | 4/2013 |
| WO | W02013/145790 | A1 | 10/2013 |
| WO | 2014/013265 | A1 | 1/2014 |

OTHER PUBLICATIONS

PFC Corofil, "PFC Corofil Intemescent Conduit", retrieved Dec. 10, 2013 at: http://www.pfc-corofil.com/sites/default/files/products/downloads/pfc_corofil_intumescent_conduit.pdf, (1 page).

Fischer Fixing Systems, "Fischer Conduit intumescent—FCi", retrieved Dec. 10, 2013 at: https://www.byko.is/media/fischer/$15_{13}$-_fischer_Conduit_Intumescent.pdf, (1 page).

ENIA (Energy Networks & Industrial Applications), "Fire stop barriers FIRE-Stop", retrieved Dec. 10, 2013 at: http://www.enia.gr/wp-content/uploads/2012/07/FireBarriersRaytechCatal_SIGGR.pdf, (7 pages).

The Sparks Direct Blog, "Aurora Fire Rated Downlights: How are they tested and how do they work?", retrieved Sep. 26, 2013 at: http://blog.sparksdirect.co.uk/tag/building-regulations/, (8 pages).

ISE Fire Products & Services Ltd., "Intumescent Fire Protection Products", 2013, retrieved Sep. 26, 2013 at: http://www.isefireproducts.co.uk/intumescent-products, (2 pages).

Kidde Fire Protection Services, "Intumescent Fire Seals Product Range", retrieved Sep. 26, 2013 at: http://www.kiddefps.com/utcfs/ws-407/Assets/Intumescent%20Fire%20Seals.pdf, (31 pages).

Pemko Manufacturing Co., Inc., "Adhesive Gasketing (AG): Adhesive-Backed Fire/Smoke Gasketing", retrieved Sep. 26, 2013 at:http://www.pemko.com/index.cfm?event=products.productListing&searchName=Search+by+Pemko+Product+Number&openFilter=loadPemkoPartNumberSearch&partNumber=s773&partCategoryIds=S773D%3A895, (6 pages).

Trademark Hardware, "Adhesive Weatherstrip, 5/16" Wide Silicone and Intumescent Fin", retrieved at: Sep. 26, 2013 at: http://www.tmhardware.com/Adhesive-Weatherstrip-Gasketing-Intumescent-Fin.html, (2pages).

Machine-generated English translation by EPO and Google, Description of EP1273841, Züull, Armin, "The invention relates to a fire sleeve", Jan. 8, 2003 (11 pages).

Machine-generated English translation by EPO and Google, Description DE19934902, Haupt, Gabriele, "The invention relates to a foreclosure of pipes, cables and ducts through walls or ceilings, as well as joints, columns and wall openings", Jan. 27, 2000 (7 pages).

Machine-generated English translation by EPO and Google, Description of DE202012003405, Doyma GmbH & Co., "The invention relates to a wrapping tape for the fire-resistant sealing of pipe passages, with a first and an opposite second side having an intumescent material under heat", Aug. 29, 2013 (33 pages).

Machine-generated English translation by EPO and Google, Description of DE102013203173, Chikatimalla, Rajesh, "The invention relates to a wrapping tape for the fire-resistant sealing of pipe passages, with a first and an opposite second side having an intumescent material under heat", Oct. 10, 2013 (29 pages).

Tesla Motors Club, "Amazing Core Tesla Battery IP—18650 Cell" retrieved from web page: http://www.teslamotorsclub.com/showthread.php/17456-Amazing-Core-Tesla-Battery-IP . . . ; Nov. 18, 2013 (10 pages).

Proquest Dialog, Flame Retardancy News 14.11 (Nov. 2004), "Great Lakes Intros New Intumescents", retrieved from web page: http://search.proquest.com/professional/docview/671320957/141D2914C631D147EDD/6 . . . ; Nov. 18, 2013 (2 pages).

\* cited by examiner

US 9,089,726 B1

PASSTHROUGH FIRESTOPS

BACKGROUND

This relates to a passthrough firestop and to a firestop element for a passthrough firestop.

When a fire breaks out in a building, it is highly desirable to contain the fire as much as possible. While a floor plate in a building may be fabricated of a fireproof material, such as concrete, passthroughs are needed to allow electrical wire and plumbing pipes to extend between floors. Unfortunately, these passthroughs provide openings that present an opportunity for a fire to spread between floors.

SUMMARY

A firestop element is fabricated wholly or partly from a polymer intumescent composition. The intumescent polymer composite is rigid and featured to enhance its surface area. The firestop element can act as a passthrough device.

In an aspect, a firestop element or a passthrough device has a rigid annular body with a first section and a second section. At least a portion of the first section is fabricated of a polymer intumescent composition. This portion has an inner annular surface with a plurality of spaced lands and a void extending between each pair of lands. The second section is a sleeve having a smaller diameter than the first section.

Other features and advantages will become apparent from the following description in conjunction with the drawings.

BRIEF DESCRIPTION OF THE DRAWINGS

In the figures which illustrate example embodiments.

DETAILED DESCRIPTION

Figure 1:
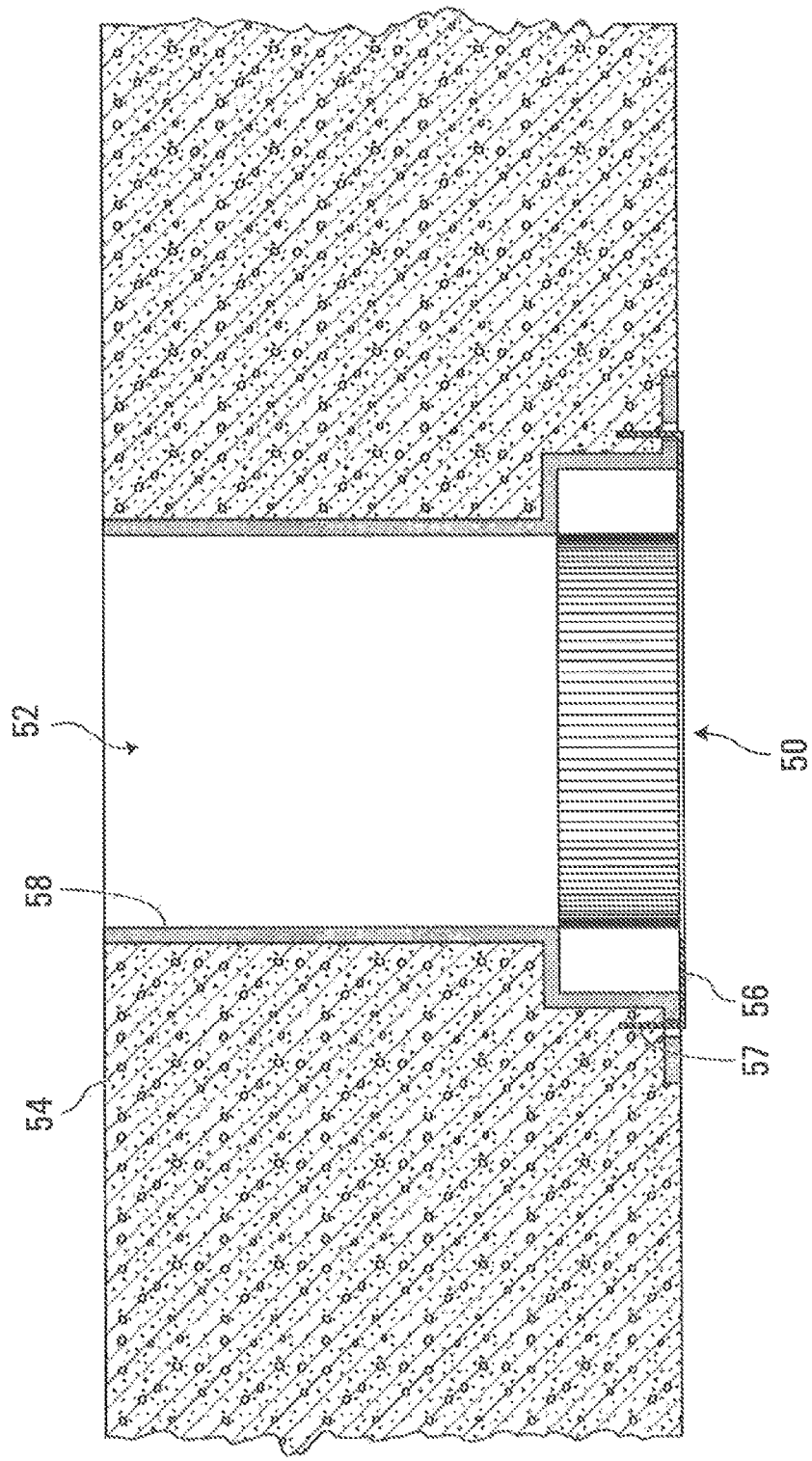
FIG. 1 is a cross-sectional view of a passthrough firestop according to an embodiment in place in a floor of a building.

With reference to FIG. 1, a passthrough firestop 50 is embedded in a stepped opening 52 of a concrete floor 54 in a building. With reference to FIGS. 2 to 5, the passthrough firestop 50 has a rigid one-piece annular body 58 with a larger diameter lower annular section 60 stepping inwardly to a smaller diameter upper annular section 62. The lower annular section 60 has a basal flange 64 with four inboard slots 66 and a plurality of outboard holes 67. The lower annular section 60 has an inner annular surface with a plurality of radially inwardly projecting fins 70. Thus, the fins project inwardly toward the central axis C of the annular section 60. The fins are regularly spaced and identical to one another. The bottom surface of each fin presents a land 72 and there is a void 74 extending between each pair of lands, and thus between each pair of fins.

The passthrough firestop 50 also has a metal ring 56 with four upstanding fingers 57, each terminating in a hammerhead 59. Each finger 57 is received through one of the slots 66 of the annular body 58 of the firestop.

The annular body 58 of the passthrough firestop 50 is fabricated of an intumescent flame retardant (IFR) material, and specifically, a polymer intumescent composition. Suitable IFR polymer composites may include base polymers, fire retardants, and blowing agents. If the base polymers are inherently fire retardant, such as PVC, CPVC, halogenated polyethylene Neoprene and phenolic resin, then the fire retardants can be omitted from the composite. Synergists such as antimony oxides and/or zinc borate can be added to improve the fire retardancy of a composite. Char-forming agents can be added to promote charring and increase yield (i.e., final volume after intumescence), and thereby improve the fire retardancy and thermal insulation of a composite. Optionally, other components such as smoke suppressants, pigments, and compatibilizers can also be added.

Suitable blowing agents include, but are not limited to, expandable graphites, intumescent hydrated alkali metal silicates, and intumescent hydrated alkali metal silicates with certain amount of other components such as those described in U.S. Pat. No. 6,645,278, the contents of which are incorporated herein by reference. The start expansion temperature (SET) of suitable blowing agents may vary between 130° C. to 300° C. Other suitable blowing agents will also be apparent to those of ordinary skill in the art. Blowing agents in the composite are generally used in amount of about 1 weight percent (wt %) to about 70 wt %.

Suitable fire retardants include, but are not limited to, polymeric halogen, monomeric halogen, alumina trihydrate, magnesium di-hydroxide, mica, talc, calcium carbonate, hydroxycarbonates, phosphorus compounds, red phosphorus, borate compounds, sulfur compounds, nitrogen compounds, silica, and/or various metal oxides. Other suitable fire retardants will also be apparent to those of ordinary skill in the art. The concentration of the fire retardants in a composite generally varies from 5 wt % to 55 wt %.

Suitable base polymers include, but are not limited to, thermoplastics, such as polyethylene, polypropylene, polyamide, ABS, polybutylene terephthalate, polyethylene terephthalate, EVA, thermosetting plastics, and elastomers, such as epoxy, Neoprene, cross-linked polyethylene, silicone, NBR, thermoplastic elastomers, or the blend of above. Other suitable base polymers will be apparent to those of ordinary skill in the art.

A mixture of the different components described above can be compounded into a composite. This composite can in turn be formed into desired geometries by known polymer processing methods such as injection molding, insert injection molding, extrusion, compression molding, blowing molding, transfer molding, calendaring, rotation molding, thermoforming, or the like. The melting temperature of the base polymers should be lower than the SET of the blowing agents in the composite. The temperature between the melting temperature of the base polymers and the SET of the blowing agents is the processing window for the composite. An IFR polymer composite formulated to have an expansion ratio of between 3 and 400 is suitable.

To install the passthrough firestop 50, it is placed on a form and nailed to the form, using the holes 67 in the flange 64 of the lower annular section 60, prior to pouring concrete into the form. After the concrete is poured, the passthrough firestop becomes embedded in the concrete as the concrete sets. In particular, the hammerhead fingers 57 of the metal disk 56 become embedded in the concrete. After the concrete has set, the form is removed leaving the passthrough firestop embedded in the floor as shown in FIG. 1. After installation, the passthrough allows plumbing and electrical connections between adjacent floors of the building. In this regard, typically a metal or plastic pipe for containing the various connections is inserted through the passthrough firestop.

In the event of a fire, the temperature of the passthrough firestop will increase. If the temperature at the passthrough firestop reaches the SET of the polymer intumescent composition, the composition will begin to intumesce. The aggregate volume of the fins 72 of the passthrough firestop is chosen so that, for the particular expansion ratio of the intumescent material of which the passthrough firestop is fabricated, during intumescence, if not impeded, the lower annular portion 60 will expand sufficiently to fill the passthrough opening. Indeed, generally it is desirable that this volume and the expansion ratio are chosen such that the lower annular portion 60, if not impeded, will expand to more than sufficiently to fill the passthrough opening with the extra volume of intumescent material bulging out below and above the location of the original lower annular section 60. If the passthrough contains a plastic pipe, this will melt or burn off during a fire and so as not to impede the expansion of the lower annular portion 60. On the other hand, any metal elements passing through the passthrough may survive the fire. The lower annular portion 60 will expand to tightly envelop any such surviving components.

By providing the lower annular section 60 with fins and voids between the fins, the surface area of the lower annular section is increased as compared to what it would be if the lower annular section were solid. The increased surface area exposes more of the intumescent material to the ambient environment and therefore shortens the reaction time of the passthrough firestop to a fire. Thus, the passthrough opening is closed off more quickly in the event of a fire.

The purpose of the upper annular section 62 is to provide an annular wall for the passthrough opening. The upper annular section 62 may also intumesce in the event of a fire.

In the event of a fire, the body 58 of the passthrough device 50 will soften before, or while, intumescing. This could present a risk of the softened body 58 falling out of the floor opening. Metal ring 56 of the device 50 is provided to guard against this risk. Specifically, as seen in FIG. 1, the fingers 57 of the metal ring 56 are embedded in the concrete floor. In this regard, the hammerheads 59 of these fingers help ensure that, after setting of the concrete, the fingers are firmly embedded. Thus, if the body 58 softens and comes loose from the concrete, metal ring 56 will maintain the body 58 in position while it expands.

Figure 6:
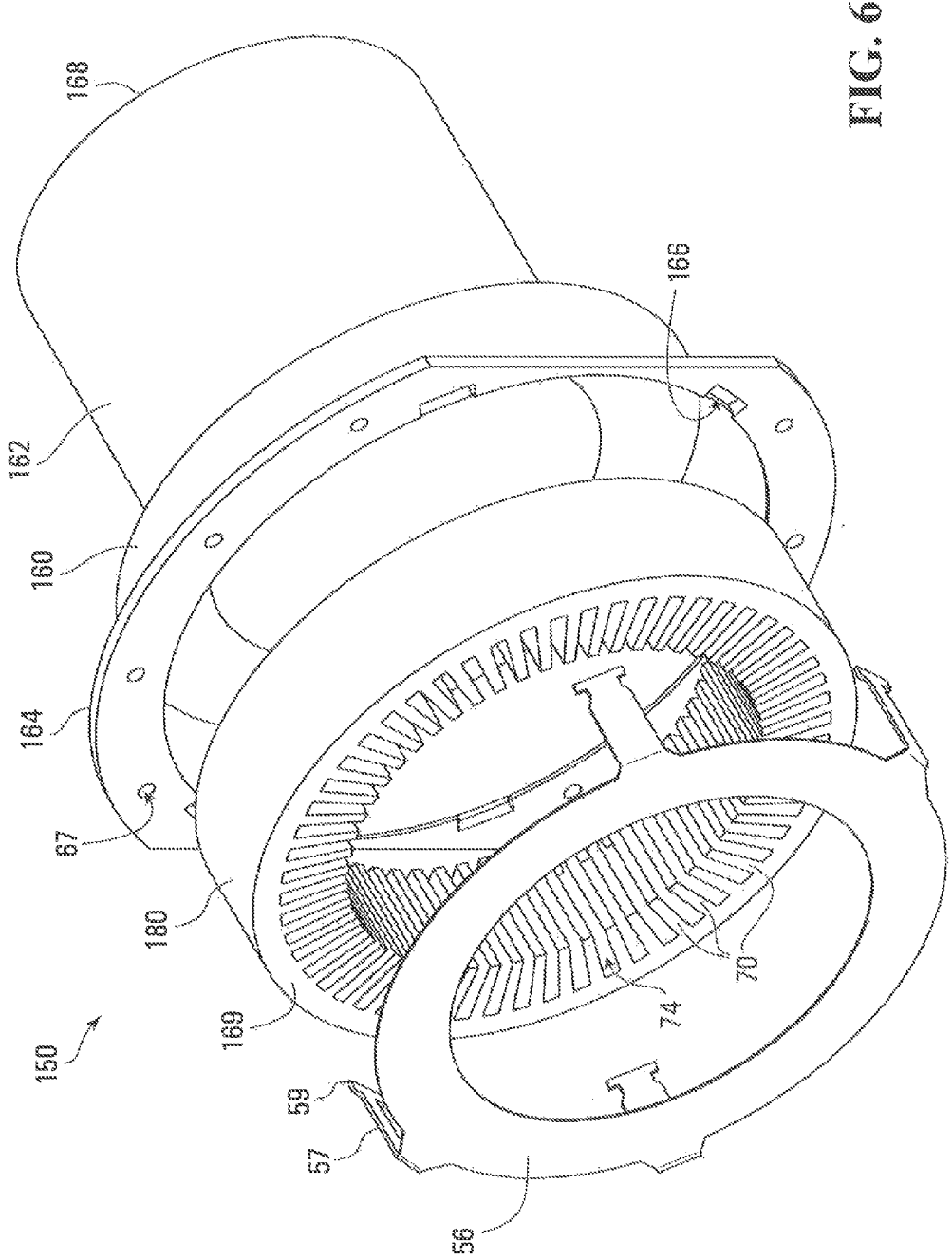
FIG. 6 is an exploded view of another embodiment of a passthrough firestop.
Figure 7:
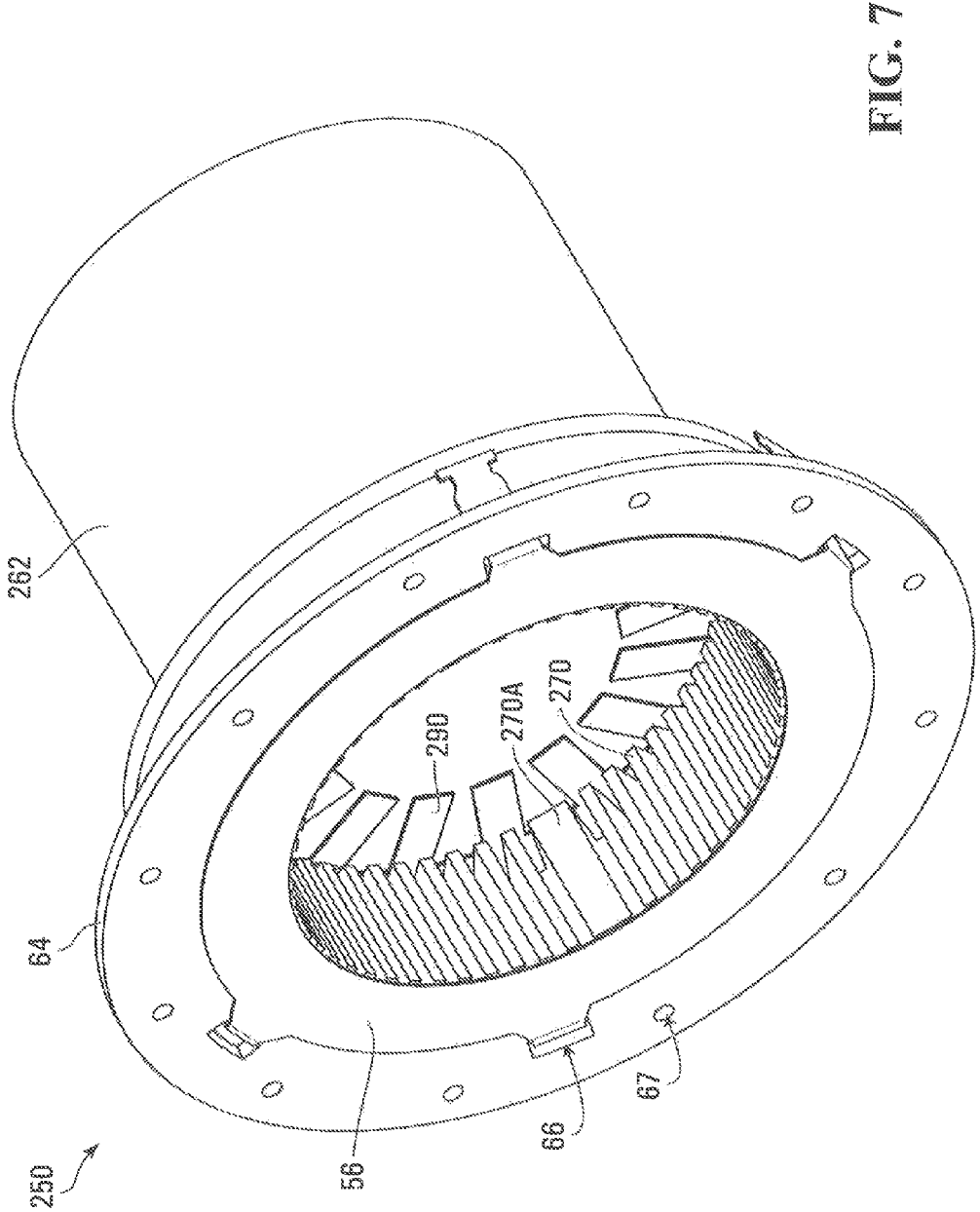
FIG. 7 is a bottom perspective view of a further embodiment of a passthrough firestop.
Figure 8:
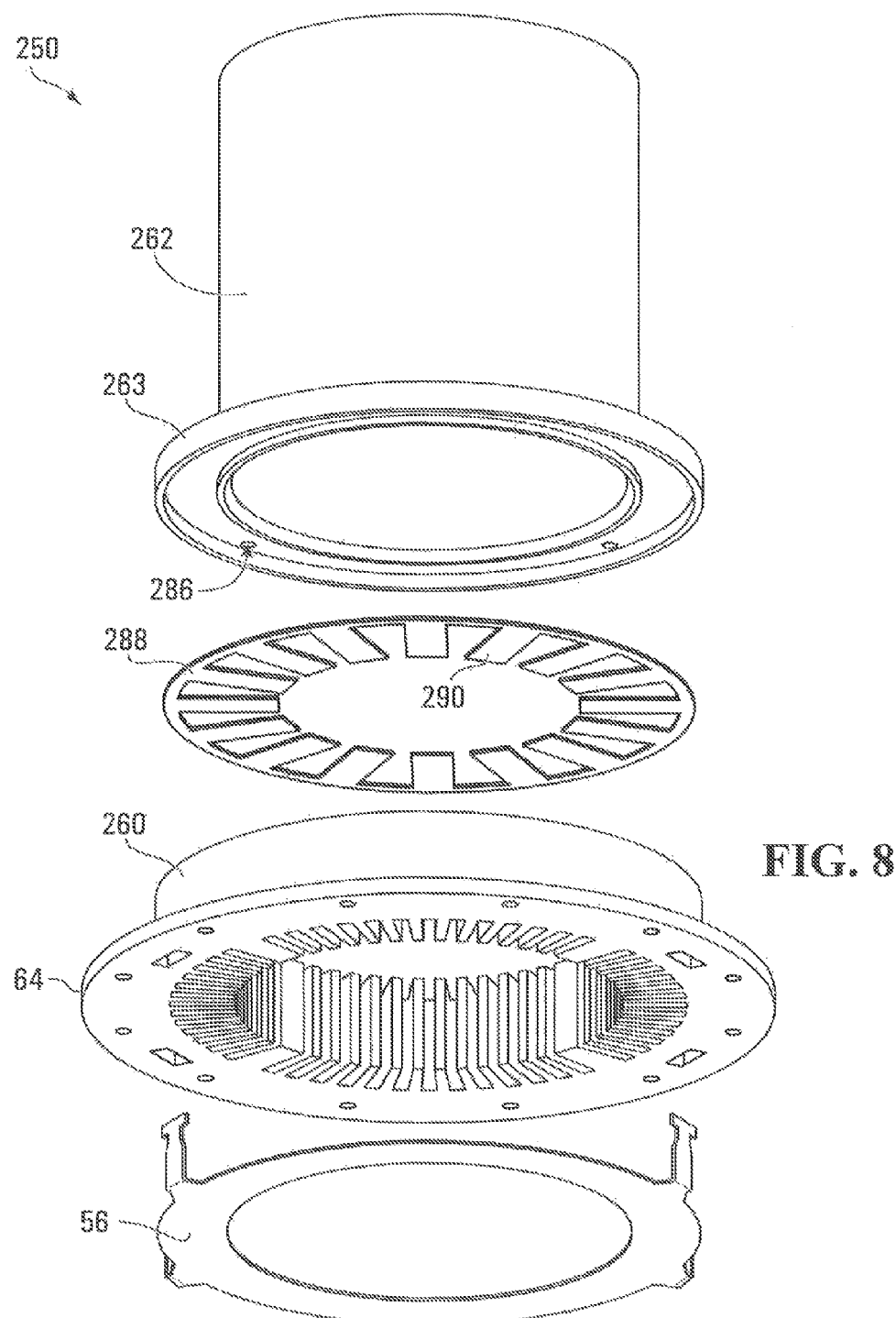
FIG. 8 is an exploded view of the passthrough firestop of FIG. 7.
Figure 9:
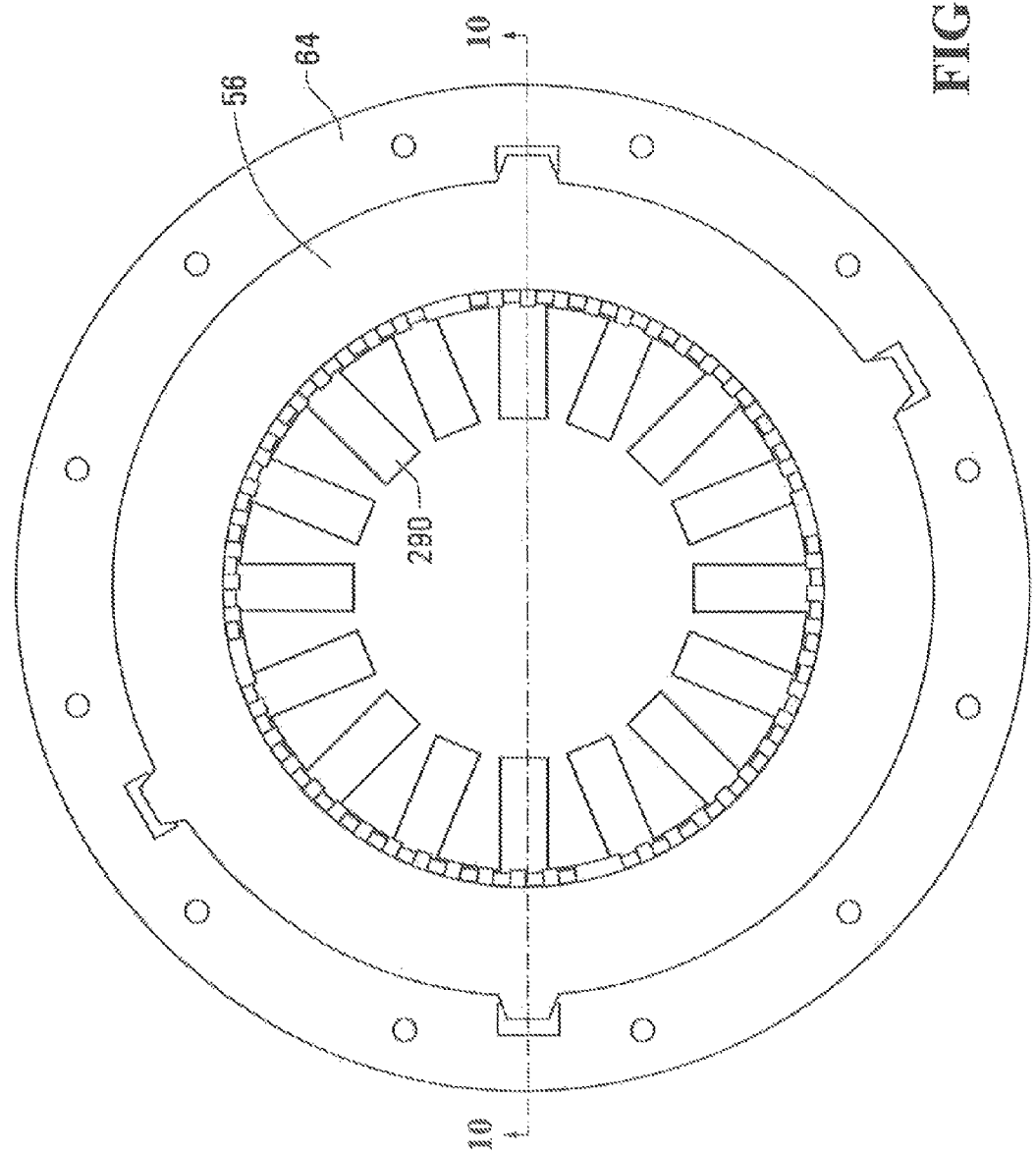
FIG. 9 is a bottom view of the passthrough firestop of FIG. 8.
Figure 10:
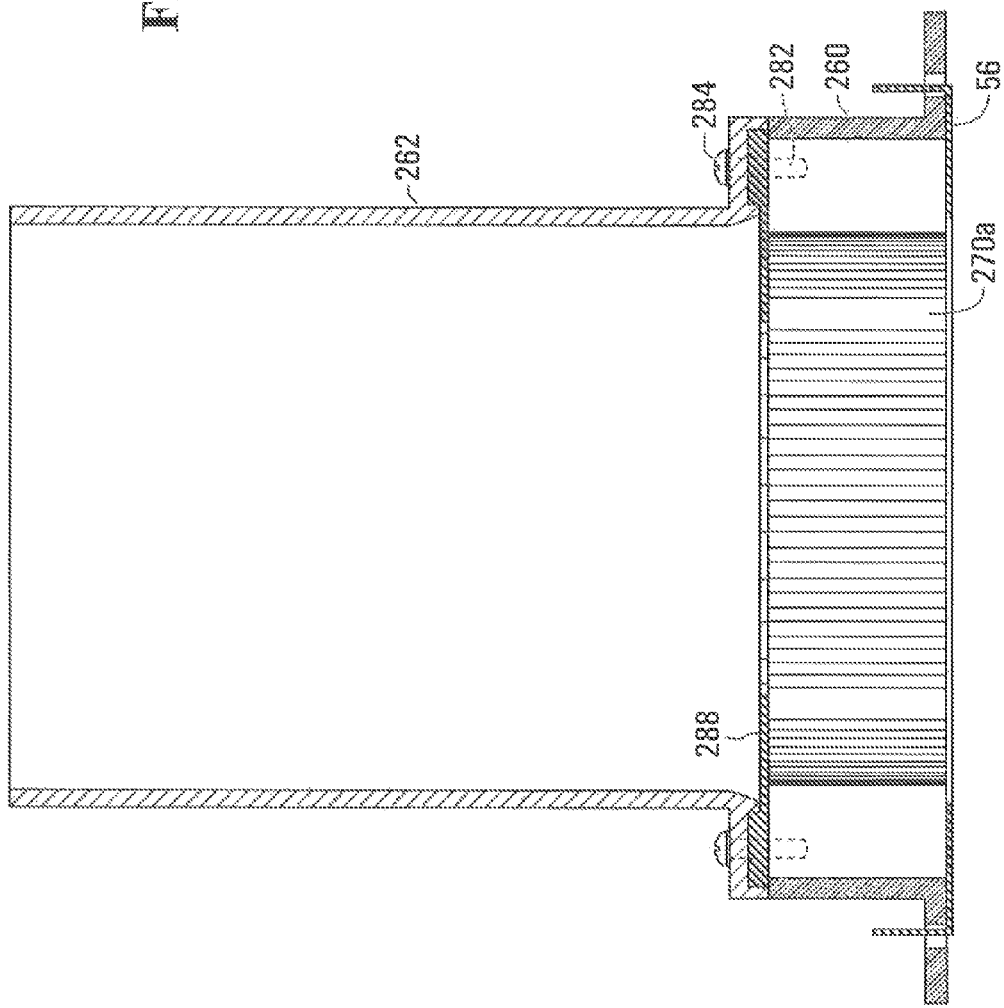
FIG. 10 is cross-sectional view of the passthrough firestop of FIG. 8 along the lines 10-10 of FIG. 9.

Turning to FIG. 6, in a second embodiment, a passthrough firestop 150 has a one-piece shell 168 with a larger diameter lower annular section 160 and a small diameter upper annular section 162. The shell may be made of an inflammable plastic material, such as a polyvinyl chloride (PVC) or chlorinated PVC (CPVC), or it can be made of a common plastic such as polyethylene (PE), polypropylene (PP), polyamide (PA), or polyethylene terephthalate (PET). The basal flange 164 of the shell 168 has four notches 166. An intumescent ring 180 is sized such that the ring may be inserted into the lower annular section 160 of the shell 168 with the outer face 169 of the ring substantially flush with the lower face of the flange 164 of the shell. The intumescent ring may be made of an IFR material as aforedescribed. The fingers 57 of a metal ring 56 are inserted through notches 166 in the shell 168.

Passthrough firestop 150 may be cast in place in the same manner as passthrough firestop 50 (FIG. 2) such that the shell 168 lines the passthrough opening. Once the passthrough firestop 150 is embedded in a concrete floor, the metal ring 56 maintains the intumescent ring 180 in place both before and during any fire. The firestop 150 functions in a similar manner to firestop 50. More specifically, in the event of a fire, if the SET of the IFR materials of ring 180 is exceeded, the ring 180 will intumesce. Again, the aggregate volume of the fins of the intumescent ring 180 and the IFR material of which it is made are chosen so that, if unimpeded, the ring will expand to close off the passthrough opening. While the intumescent ring expands during a fire, the shell 168 of the firestop 150, being plastic, will not intumesce, but may instead partially melt from the heat of the fire.

Turning to FIGS. 7 to 10, in a further embodiment, a passthrough firestop 250 has a larger diameter lower annular section 260 and a separate smaller diameter upper annular section 262. The lower annular section has a basal flange 64 with slots 66 and an inner annular surface with a plurality of radially inwardly projecting fins 270. The fins are regularly spaced and, apart from four enlarged fins 270a, identical to one another. A blind hole 282 extends through the top of each enlarged fin 270a. The upper annular section 262 has a skirt 263 with holes 286 and the upper annular section is joined to the lower annular section 260 by screws 284 that pass through the openings 286 in the upper annular section and are screwed into the blind holes 282 of the lower annular section. A metal disk 288 is sandwiched between the lower and upper annular sections 260, 262. The metal disk has a plurality of inwardly directed spring fingers 290.

The lower annular section 260 is made of an intumescent material like the lower annular section 60 (FIG. 2) of firestop 50 (FIG. 2) and the aggregate volume of the fins 270 and the intumescent material are chosen so that, if unimpeded, the ring will expand to close off the passthrough opening. On the other hand, the upper annular section 262 is made of a common plastic material.

Figure 2:
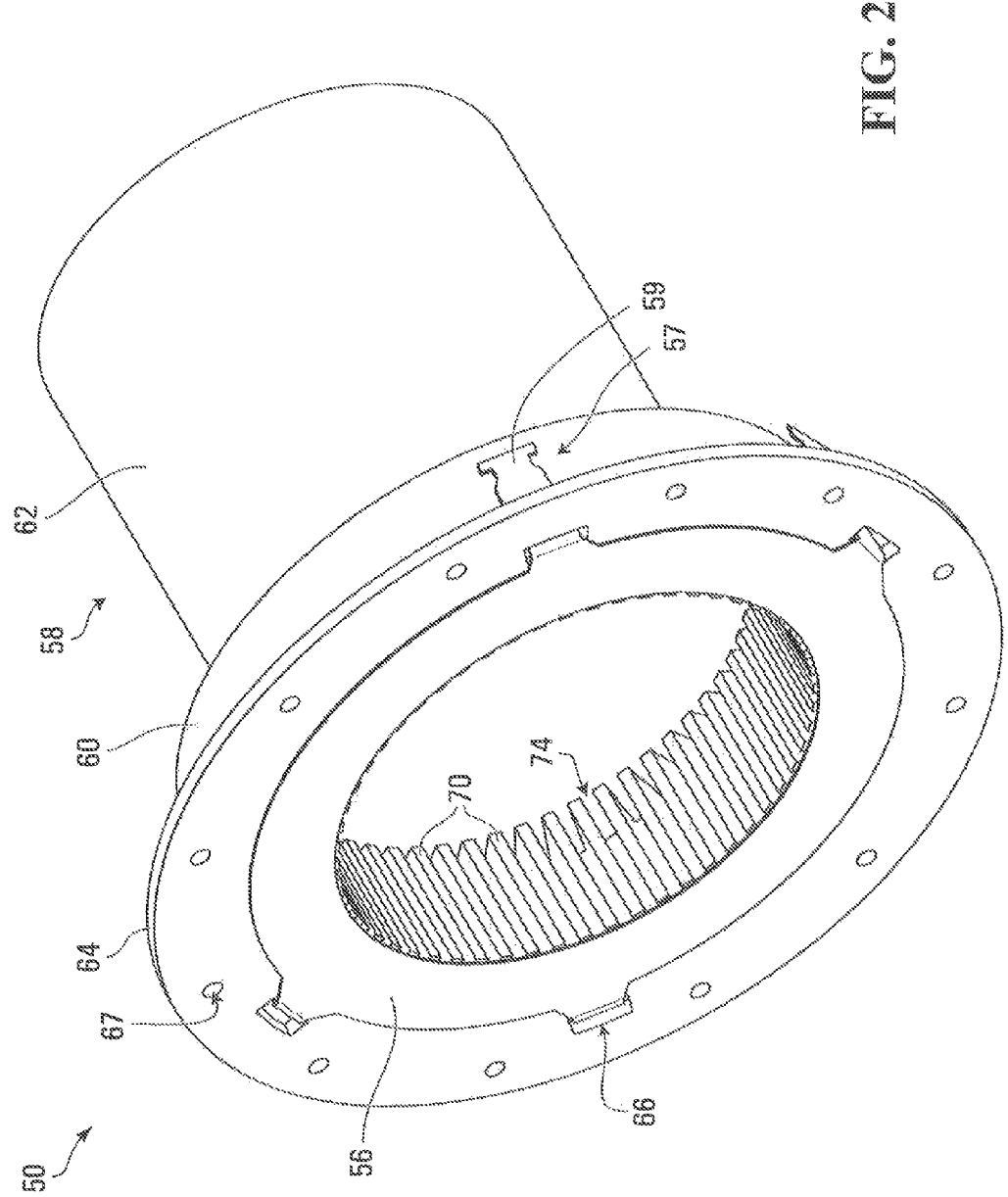
FIG. 2 is a bottom perspective view of the passthrough firestop of FIG. 1.
Figure 3:
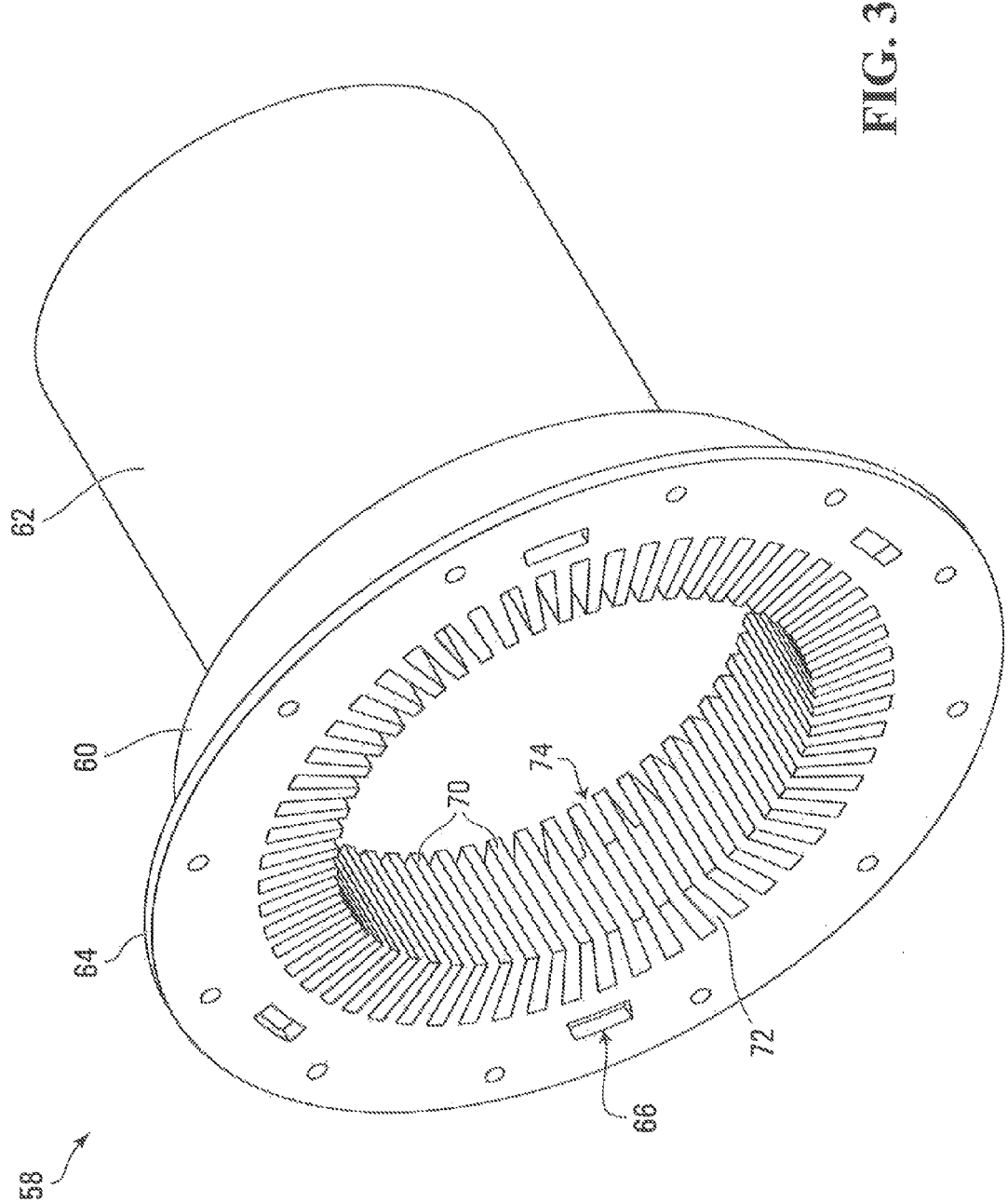
FIG. 3 is a bottom perspective view of the passthrough firestop of FIG. 1 with a metal ring removed.
Figure 4:
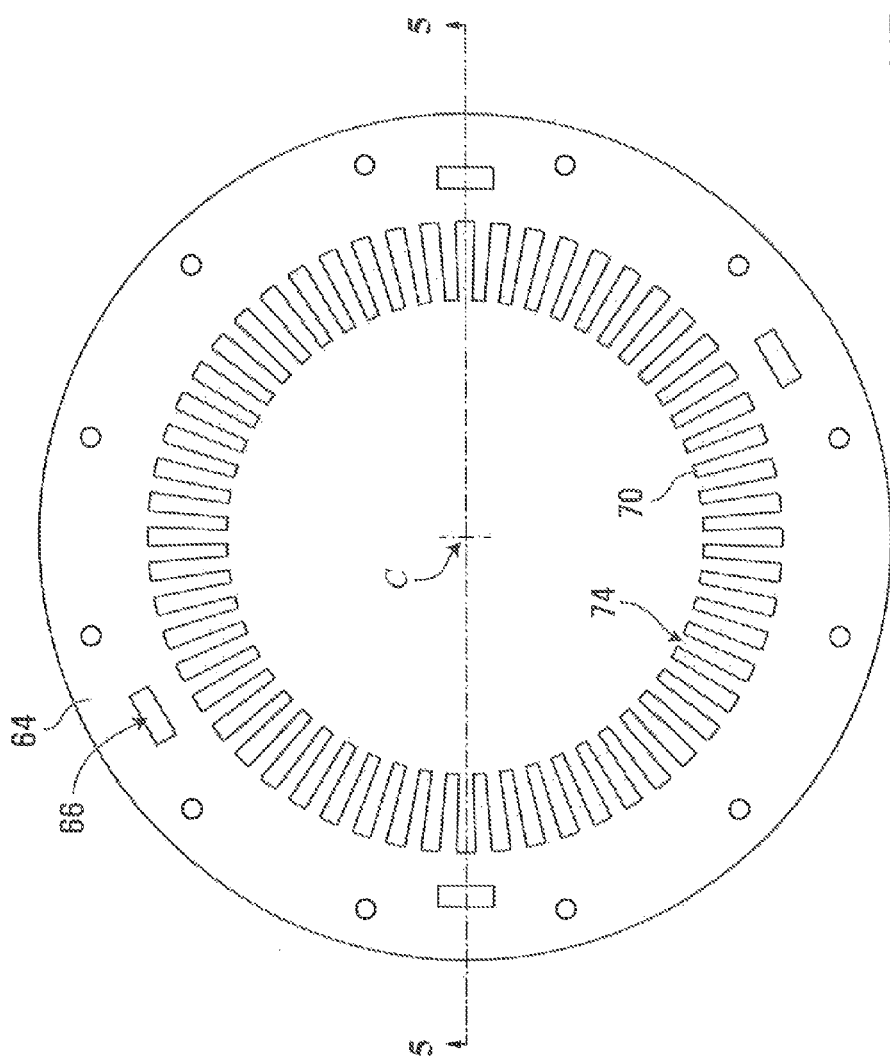
FIG. 4 is a bottom view of FIG. 3.
Figure 5:
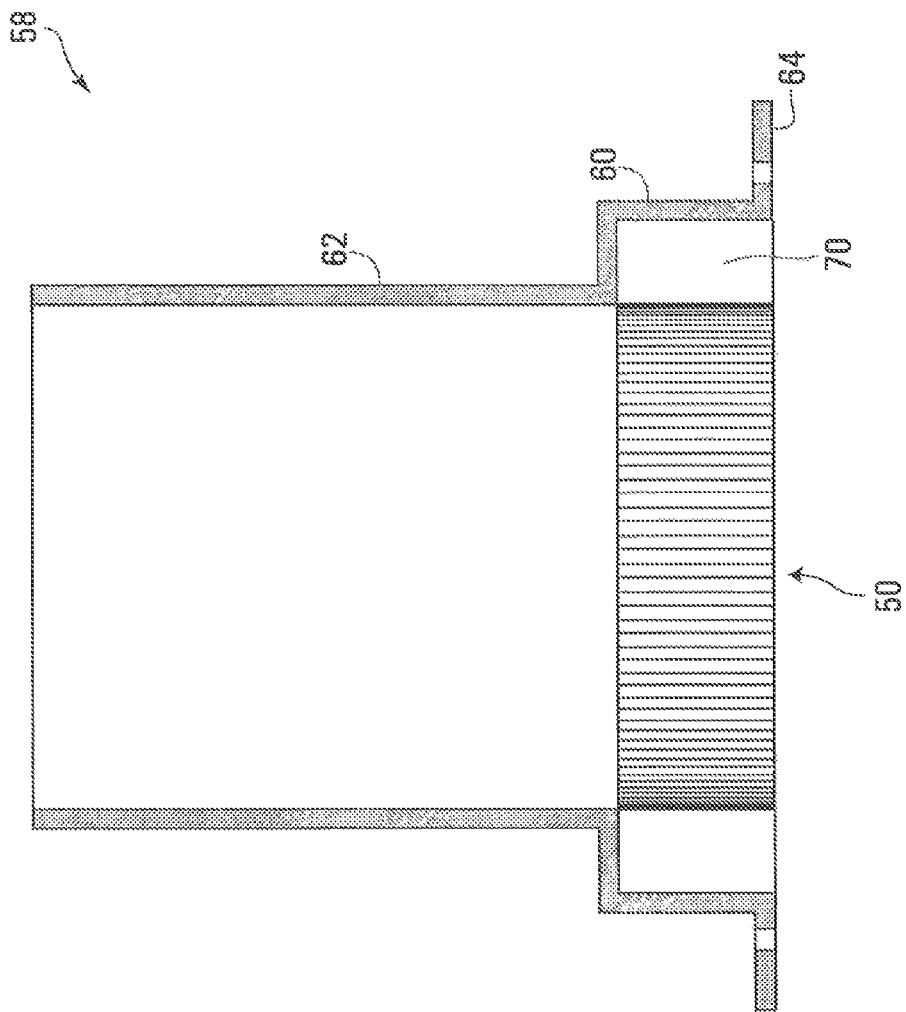
FIG. 5 is cross-sectional view along the lines 5-5 of FIG. 4.

Passthrough firestop 250 is cast in place in a floor in the same manner as passthrough firestop 50 (FIG. 2). Thereafter, a pipe may be pushed through the passthrough firestop 250: the metal fingers 290 of metal disk 288 will deflect to allow the pipe to pass through.

In the event of a fire, similarly to lower section 60 of firestop 50 (FIG. 2), the lower section 260 of passthrough firestop 250 will intumesce and expand. The upper annular section 262 may melt, but this will not interfere with the expansion of the lower annular section. Any plastic pipe extending through the passthrough will also melt or burn off in the event of fire. In such instance, the metal spring fingers 290 of metal disk 288 will relax. These metal spring fingers (whether in a relaxed state or deflected by a passthrough pipe) exert a force against any upwardly expanding portion of lower annular section 260. This force helps to densify the char formed from the intumescing lower annular section. Moreover, these spring fingers also help the char resist hose stream pressure should a fire hose be directed at the passthrough.

Figure 11:
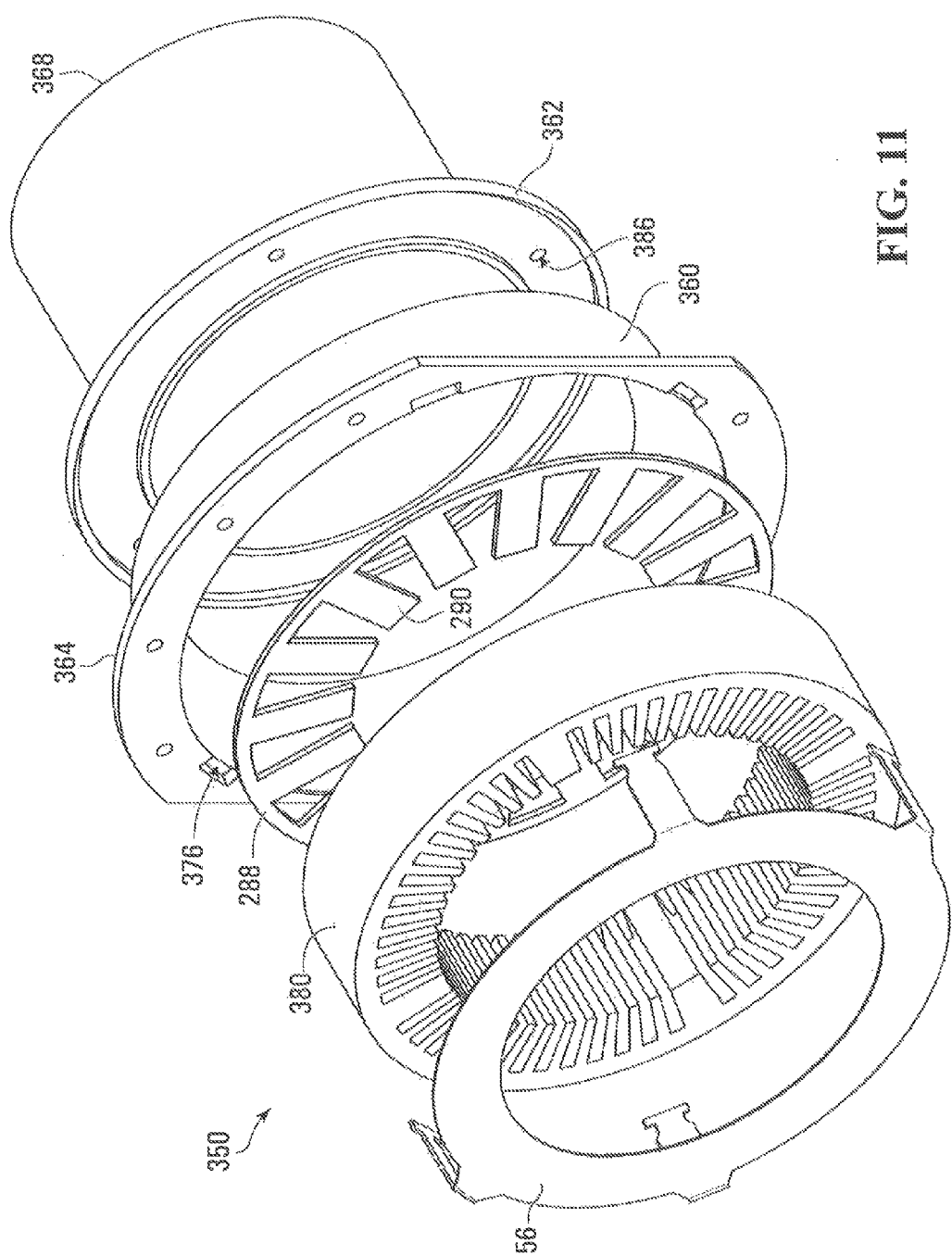
FIG. 11 is an exploded view of yet another embodiment of a passthrough firestop.

Turning to FIG. 11, in a further embodiment, passthrough firestop 350 has a shell 368 with an upper annular section 362 and a lower annular section 360. The shell may be made of a common plastic material. The basal flange 364 of the shell 368 has four slots 376. A metal disk 288 and an intumescent ring 380 may be inserted into lower annular section 360 and screws (not shown) passed through the holes 386 in the upper annular section and into blind holes (not shown) in the intumescent ring 380 to hold the lower annular section 360 against the upper annular section 362 and the intumescent ring 380 and surmounting metal disk 288 in place within the lower annular section 360. The fingers 57 of metal ring 56 may then be inserted through the slots 376 of the lower annular section. The intumescent ring may be made of an IFR material as aforedescribed.

Passthrough firestop 350 may be cast in place in the same manner as passthrough firestop 50 (FIG. 2) such that the shell 368 lines the passthrough opening. The firestop 350 functions in a similar manner to firestop 250 of FIGS. 7 to 10. More specifically, in the event of a fire, if the SET of the IFR materials of ring 380 is exceeded, the ring 380 will intumesce. Again, the aggregate volume of the fins of the intumescent ring 380 and the IFR material are chosen so that, if unimpeded, the ring will expand to close off the passthrough opening. While the intumescent ring expands during a fire, the two-piece shell 368 of the firestop 350, being plastic, will not intumesce, but may instead may partially melt from the heat of the fire. Throughout, the metal ring 56, which has its fingers 57 firmly embedded in the concrete floor, keeps the intumescent ring 380 and surmounting metal disk 288 in place. Also, the spring fingers 290 of the metal disk 288 assists in densifying the char.

The two or three piece body designs of FIGS. 6 to 11 have the advantage over the one piece body design of FIGS. 1 to 5 that they require less intumescent material, thus reducing cost. The two or three piece body designs of FIGS. 7 to 11 have the further advantage that they allow the use of metal disk 288 with spring fingers 290 that helps to densify char. Two or three piece designs also allow the use of a smoke sealing ring (not shown) at the interface of two parts.

Other modifications will be apparent to one of skill in the art and, therefore, the invention is defined in the claims.

What is claimed is:

1. A firestop element having:
   a rigid annular body having a first section and a second section;
   at least a portion of said first section fabricated of a polymer intumescent composition;
   said at least a portion of said first section having an inner annular surface with a plurality of spaced lands and a void extending between each pair of lands;
   said second section being a sleeve having a smaller diameter than said first section;
   wherein said at least a portion of said first section is a disk and said first section further comprises a sleeve portion sized to receive said disk.

2. The firestop element of claim 1 wherein each land of said plurality of lands is identical to each other land of said plurality of lands.

3. The firestop element of claim 2 wherein said each land is a termination of a solid portion of said body.

4. The firestop element of claim 3 wherein each said solid portion is a projection which projects inwardly from a base of said inner annular surface such that there are a plurality of projections, each terminated by one said land.

5. The firestop element of claim 4 wherein said plurality of projections project inwardly toward a central axis of said annular section.

6. The firestop element of claim 5 wherein said projections are fins.

7. The firestop element of claim 1 further comprising a retainer ring with a plurality of fingers received through slots in said sleeve portion of said first section.

8. A passthrough device comprising:
   a rigid annular body having a first section and a second section;
   at least a portion of said first section fabricated of a polymer intumescent composition;
   said at least a portion of said first section having an inner annular surface with a plurality of radially inwardly projecting spaced fins and a void extending between each pair of fins;
   said second section being a sleeve having a smaller diameter than said first section;
   wherein said at least a portion of said first section is an intumescent ring and said first section further comprises a sleeve portion sized to receive said intumescent ring;
   a retainer ring with a plurality of fingers received through slots in said sleeve portion of said first section.

9. The passthrough device of claim 8 further comprising a metal disk disposed between said intumescent ring and said second section, said metal disk having inwardly directed spring fingers.

10. A firestop element for a passthrough opening comprising:
    a rigid intumescent element at least a portion of which is fabricated of a polymer intumescent composition;
    a metal retainer extending under said rigid intumescent element, said metal retainer having a body and a plurality of fingers projecting upwardly from said body, said metal retainer for retaining said rigid intumescent element within said passthrough opening.

11. The firestop element of claim 10 wherein said polymer intumescent composition comprises a polymer and expandable graphite.

12. The firestop element of claim 10 wherein said polymer intumescent composition comprises a polymer and a hydrated alkali metal silicate.

13. The firestop element of claim 10 further comprising:
    a shell having a smaller diameter upper section and a larger diameter lower section;
    said intumescent element being an intumescent ring received within said larger diameter lower section of said shell.

14. The firestop element of claim 13 further comprising a metal disk disposed above said intumescent ring and below the smaller diameter upper end of said shell, said metal disk having inwardly directed spring fingers.

15. The firestop element of claim 14 wherein said shell is a two-piece shell comprising said smaller diameter upper section and said larger diameter lower section, said upper section being joined to said lower section.

16. The firestop element of claim 15 wherein said upper section has a different composition than said lower section.

17. The firestop element of claim 16 wherein said metal disk is disposed between said upper section and said lower section.

18. The firestop element of claim 14 wherein said shell is a one-piece shell.

19. The firestop element of claim 13 wherein said intumescent ring has a plurality of inwardly projecting fins.

20. The firestop element of claim 13 wherein said body of said metal retainer is a ring-shaped body and said fingers project axially from said ring-shaped body.

21. The firestop element of claim 20 wherein each of said fingers terminates in an enlarged head.

22. The firestop element of claim 21 wherein said larger diameter lower section has slots and said fingers of said metal retainer are received within said slots.

* * * * *